B. M. MATHIAS.
FREIGHT CAR FLOOR CONSTRUCTION.
APPLICATION FILED JUNE 13, 1917.
1,254,920. Patented Jan. 29, 1918.
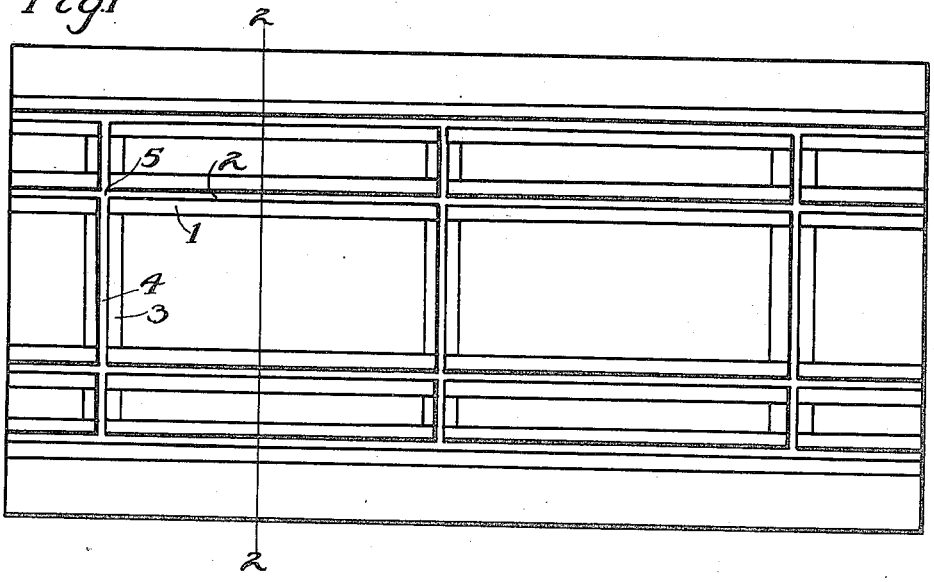
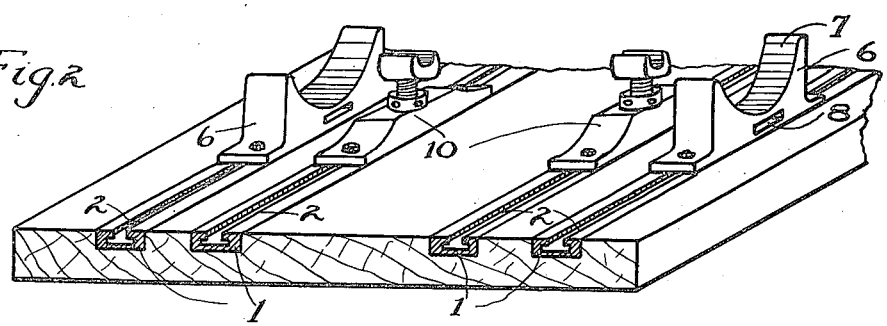
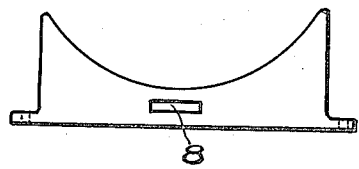
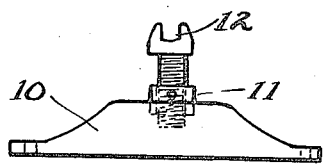
Inventor:
Berton M. Mathias
by C. D. Enochs
Attorney.

UNITED STATES PATENT OFFICE.

BERTON M. MATHIAS, OF MINNEAPOLIS, MINNESOTA.

FREIGHT-CAR-FLOOR CONSTRUCTION.

1,254,920.  Specification of Letters Patent.  Patented Jan. 29, 1918.

Application filed June 13, 1917. Serial No. 176,625.

*To all whom it may concern:*

Be it known that I, BERTON M. MATHIAS, a citizen of the United States, and a resident of Minneapolis, in the county of Hennepin and State of Minnesota, have invented certain new and useful Improvements in Freight-Car-Floor Constructions, of which the following is a specification.

One object of my invention is to provide in a freight car floor means for attachment thereto of automobile supporting brackets.

Another object of my invention is to provide in a freight car floor means for readily fastening thereto boxes and the like.

Another object of my invention is to provide a support for automobile wheels and means for attaching the support to a freight car floor.

With these and incidental objects in view the invention consists of certain novel features of construction and combination of parts, the essential elements of which are hereinafter described with reference to the drawing which accompanies and forms a part of this specification.

In the drawing Figure 1 is a plan view of a portion of the floor with my improved construction embodied therein; Fig. 2 is a fragmentary section taken on the line 2—2 Fig. 1, and showing the supporting devices applied thereto in isometric projection; Fig. 3 is a side elevation of a supporting means for an automobile wheel; and Fig. 4 is a side elevation of a supporting means for an automobile axle.

In my preferred construction I form a car floor having as an integral part thereof a bar 1, Fig. 1, having a T slot 2 therein running longitudinally, as better shown in Fig. 2.

I also provide transverse bars 3 having T slots 4, the slots crossing each other as at 5 so that bolts may be positioned in the slots at any part of either bar.

A wheel support 6, Fig. 2, is formed at 7 to receive a car wheel and a rectangular shaped aperture 8 is provided for passing therethrough a strap that may be drawn over the wheel felly and tire to securely fasten the wheel to the support.

An axle 10 is also provided having adjustment means 11 to adjust the supporting portion 12 to the proper height for the axle.

The support 11 may be used as a jack to lift up the car so that it can be slid into engagement with the support 6 and the car may be supported both by the axle support and the wheel support or by one style of support only as desired.

This car construction also lends itself readily to the fastening of boxes or any kind of freight, especially on open cars, as straps either of metal or leather may be readily fastened to the T slots passing over the articles to be fastened.

While I have described my invention and illustrated it in one particular design, I do not wish it understood that I limit myself to this construction as it is evident that the invention may be varied in many ways within the scope of the following claims:

1. In a freight car floor the combination of floor members, one of which is a longitudinal bar having a longitudinal T slot therein.

2. In a freight car floor the combination of floor members one of which is a longitudinal bar having a longitudinal T slot therein and another of which is a transverse bar having a T slot running longitudinally thereof.

3. In a freight car floor the combination of floor members, one of which is a longitudinal bar having a T slot running longitudinally thereof, another of which is a transverse bar having a T slot running longitudinally thereof, said slots crossing each other at substantially right angles.

4. In a freight car floor the combination of floor members one of which is a longitudinal bar having a T slot running longitudinally therein and a wheel supporting member adapted to receive an automobile wheel, and means for fastening said wheel support to said longitudinal bar.

5. In a freight car floor the combination of floor members one of which is a longitudinal bar having a T slot running longitudinally thereof, of a support for an automobile wheel adapted to receive therein said wheel, means for attaching said support to said longitudinal bar, an axle supporting member, and means for attaching said axle supporting member to said longitudinal bar.

6. In a freight car floor the combination of floor members one of which is a longitudinal bar having a T slot running longitudinally thereof, a wheel supporting bracket, means for attaching said bracket to said longitudinal bar, an adjustable axle bracket, and means for attaching said adjustable axle bracket to said longitudinal bar.

7. In a freight car floor the combination of floor members one of which is a longitudinal bar having a T slot running longitudinally therein, another of which is a transverse bar having a T slot running longitudinally therein, a wheel support adapted to receive therein an automobile wheel, an axle support adapted to receive therein an automobile axle, and means for attaching either of said supports to either of said bars.

8. In a freight car floor the combination of floor members one of which is a bar having a longitudinal T slot therein, a wheel supporting member adapted to receive therein an automobile wheel, said wheel supporting member having positioned below the support for receiving said wheel an aperture for passing therethrough a strap for the purpose of securing said wheel to said support.

BERTON M. MATHIAS.